United States Patent [19]
Capozzi et al.

[11] Patent Number: 5,164,993
[45] Date of Patent: Nov. 17, 1992

[54] METHOD AND APPARATUS FOR AUTOMATIC TONESCALE GENERATION IN DIGITAL RADIOGRAPHIC IMAGES

[75] Inventors: John R. Capozzi, Rochester; Ralph Schaetzing, Pittsford, both of N.Y.

[73] Assignee: Eastman Kodak Company, Rochester, N.Y.

[21] Appl. No.: 797,615

[22] Filed: Nov. 25, 1991

[51] Int. Cl.⁵ .............................................. G06K 9/00
[52] U.S. Cl. .................................. 382/6; 364/413.13; 358/111; 378/901; 382/51
[58] Field of Search ................. 378/62, 901; 358/111, 358/445, 455, 461, 464, 466; 364/413.13, 413.22, 413.23, 413.26; 382/6, 18, 51, 54

[56] References Cited

U.S. PATENT DOCUMENTS

| | | | |
|---|---|---|---|
| 4,302,672 | 11/1981 | Kato et al. | 250/327 |
| 4,641,268 | 2/1987 | Asai et al. | 364/413.13 |
| 4,778,745 | 10/1988 | Leung | 356/394 |
| 4,823,394 | 4/1989 | Berkin et al. | 382/8 |
| 4,845,558 | 7/1989 | Tsai et al. | 358/106 |
| 4,853,967 | 8/1989 | Mandeville | 382/8 |
| 5,046,012 | 9/1991 | Morishita et al. | 382/8 |
| 5,046,118 | 9/1991 | Ajewole et al. | 382/51 |

Primary Examiner—Jose Couso
Attorney, Agent, or Firm—William F. Noval

[57] ABSTRACT

A method and apparatus for automatically and adaptively generating tonescale transformation functions that are robust with respect to imaging systems, exposure conditions, and body parts. The technique uses the histogram of the digital input image, the cumulative distribution function of the histogram, and the entropy of subsections of the histogram to create the final tonescale transformation. Using these three functions, the histogram can be divided into a region of interest, a low-signal foreground region, and a high-signal background region. The tonescale is constructed to be substantially linear over the region of interest, joining smoothly with a nonlinear portion extending from the end of the low-signal foreground region to the start of the region of interest, and another nonlinear portion of the high-signal background region. The substantially linear region of interest and the entire image are subject to certain output density constraints to optimize the diagnostic utility of the final image. The technique depends entirely on the histogram of the input image, and, hence, it is adaptive and robust.

22 Claims, 12 Drawing Sheets

METHOD AND APPARATUS FOR AUTOMATIC TONESCALE GENERATION IN DIGITAL RADIOGRAPHIC IMAGES

TECHNICAL FIELD OF THE INVENTION

The present invention relates to digital image processing, and more particularly to a method and apparatus for automatically adjusting the tonescale of a digital radiographic image.

BACKGROUND OF THE INVENTION

When any digital image is displayed on some output medium (e.g., film or a CRT monitor), its image quality depends on a number of important factors, such as the characteristics of the device used to acquire the original data, the capabilities of the output device (dynamic range, noise characteristics, sharpness, etc.), and the image processing that has been performed on the image prior to display. In particular, the image processing tone reproduction function (i.e., the tonescale or gradation curve) used to map the digital values of the image into viewable shades of gray is a key component in producing a useful output image.

In the case of diagnostic radiology, for example, the tonescale used for display of images of various body parts has a significant impact on the ability of the image interpreter (i.e., the radiologist or physician) to extract useful diagnostic information from the image. In conventional (analog) screen/film radiography, this output tonescale is generally already designed into the film by the film manufacturer, and a variety of different films is available to get different 'looks' depending on exam types, exposing techniques, and observer preferences. The ability in digital radiography systems to adjust this output tonescale in the computer before the final image is displayed is one of the most powerful features of such systems. However, choosing or creating the appropriate tonescale is not always a simple operation because it depends, among other things, on the above mentioned factors (exam type, exposure conditions, imaging modality, dynamic range of the output device, etc.).

Ideally each digital image should have its own tonescale function in order to be displayed optimally. This is because the actual distribution of gray levels in an image (i.e., the image histogram) is different for each image. Usually, however, there are some general similarities within certain classes of images (e.g., for a given x-ray acquisition device and set of exposure conditions, all adult chest radiographs will probably share some common characteristics) that make the tonescale generation process somewhat easier. The tonescale transformation that produces an image of high diagnostic quality must ensure, among other things, good contrast in the region of interest, reasonable contrast in the remainder of the image, no clipping (i.e. saturation) of useful anatomical detail at the ends of the gray level range, and no artifacts.

An additional complication in generating an optimum output tonescale for a given digital image, already mentioned briefly above, is that this tonescale depends critically on how the image was acquired. The creation of a digital image requires an analog to digital (A/D) conversion process in which the values of the continuously varying physical variable being measured (for example, x-ray transmittance or attenuation, proton density, or radioactivity) are transformed (quantized) into the set of discrete gray levels that represent the image in the digital domain. This A/D conversion function, also known as the input calibration function, is generally a monotonic nonincreasing or nondecreasing function. It assigns to each value of the physical variable a gray level in the digital image. Thus, the output tonescale, which maps these input gray levels to output gray levels for a display device, is essentially a mapping of the values of the input physical variable into output luminance on a display (e.g. a CRT or film on a viewbox). At the same time, small differences in gray level in the digital image are related to small differences in the value of the physical variable (through the derivative of the input calibration function). Thus, the shape (specifically, the local slope) of the output tonescale also determines the visual contrast of small differences in the input physical variable.

Two commonly used forms of input calibration function are linear and logarithmic transformations, although there are also variety of other nonlinear transformations. In the linear transformation, the digital gray levels are lineally related to values of the input physical variable:

$$m_i = \alpha^* x + \beta,$$

where the $m_i$ are the input gray levels, x is the physical variable being measured, and $\alpha$ and $\beta$ are constants. In the case of logarithmic conversion, the input gray levels vary logarithmically with the input physical variable:

$$m_i = \sigma^* \log(x+\gamma) + \delta$$

where $m_i$ and x are as above and $\sigma$, $\gamma$, and $\delta$ are constants. Tonescale mapping functions designed for logarithmically acquired input images will produce suboptimal results when applied to linearly acquired images and vice versa. This is because the human visual system will perceive a different visual contrast of various structures in the output image depending on whether small differences in gray level are linearly or logarithmically related to small differences in the physical variable being displayed. Thus, in order to be adaptive and robust, a tonescale generation method must be able to produce high-quality results with different kinds of input calibration functions.

Various methods have been tried to generate tonescale curves for digital images, and especially digital radiographic images. One common technique is called histogram equalization (see, for example, Castleman, Digital Image Processing). In this technique, an attempt is made to transform the input image into an output image that has a uniform (i.e., flat) histogram over the entire output gray level range, the idea being that this output image makes maximal use of the available gray levels, and has, according to information theory, maximum information. In most cases, histogram equalization is a fairly severe transformation. Highly populated regions of the input histogram are spread over a wider range of gray levels on output, which increases their visual contrast and is usually desirable, if not overdone. However, sparsely populated regions of the histogram (usually the extremes) are compressed into a smaller gray level range, which decreases visual contrast and can obscure important diagnostic details. In addition, the presence of nonuniform foreground and background regions in an image (e.g., collimator blades, direct x-ray transmission outside the patient) can cause this technique to waste valuable output gray levels on diagnostically unimportant regions of the image.

Other techniques, instead of using locally adaptive transformations as above, have used gross statistical features (variance, skewness, percentiles, etc.) of the input histogram in order to calculate the tonescale. This approach does not always produce acceptable contrast and can also produce unwanted clipping at the ends of the gray level range. European Patent Application EP283255 teaches such a technique in which operator intervention is needed to set the initial tonescale parameters for a series of similar images to get a reasonable contrast and to avoid clipping, after which the tonescales are calculated automatically based on the mean and variance of each input histogram.

Another method has been disclosed in U.S. Pat. No. 4,302,672 in which an optimal tonescale transformation is derived for a PA (postero-anterior) or AP (antero-posterior) chest radiograph generated on a storage phosphor acquisition system (with a logarithmic input calibration function). This patent teaches that by identifying in the input image histogram the spine, heart and lung regions, and assigning the appropriate contrast to each in the output tonescale, an improved output image can be gotten. The lung region gets the highest contrast, the heart a somewhat lower contrast, and the spine gets the lowest contrast. While this approach may work for certain kinds of chest images, it may fail in chests where it is not possible to identify the three structures correctly (e.g., in cases where the lungs are fluid-filled and have comparable density to the heart or spine). Furthermore, a similar analysis of other exam types with the appropriate anatomical landmarks would need to be done so that the method could work for all diagnostic applications. In addition, this method is not robust with respect to other input calibration functions, since the appropriate contrasts for spine, heart and lungs will be different depending on the A/D conversion technique.

As an alternative to this approach, U.S. Pat. No. 4,641,267 teaches a method, again for computed radiography, that is based on the use of only a few reference tonescale functions. In order to generate the actual tonescale for a particular input image, one of the reference tonescales is selected (depending on the body part) and this function is shifted and rotated by varying amounts depending on the exposure and other parameters of the image. While this method avoids generating and storing a large number of tonescales for varying conditions a priori, it (a) is not completely automatic and adaptive, since only shifting and rotating of a fixed set of predetermined curves is allowed, (b) is not robust with respect to different digital imaging modalities or input calibration functions.

Another method has been proposed in U.S. Pat. No. 5,046,118 (Ajewole and Schaetzing) that uses some local adaptivity and some global constraints to produce a custom tonescale for each input image. This method uses the entropy of subsets of the complete image to divide the image into a region of interest (containing anatomical information) and a background region, and then constructs separate tonescales for each of these regions based on global luminance and contrast constraints. The tonescale in the region of interest is substantially linear (assuming a linear input calibration function), while the tonescale in the background region is nonlinear in order to reduce the contrast of unimportant parts of the image. The two partial tonescales are subject to certain matching criteria at their boundary in order to produce a smooth final output. While this method is fairly robust with respect to histogram shape and varying amounts of extraneous background, it does not adapt well to differences in input calibration function, and thus will produce suboptimal tonescales for other than linear A/D conversions.

There is presently a need for an automatic method and apparatus for generating tonescale transformation functions that are robust with respect to image-to-image variations, imaging modalities, exposure conditions and input calibration functions.

SUMMARY OF THE INVENTION

The object of this invention is to provide a method and apparatus for automatically and adaptively generating optimum tonescale transformations for digital radiographic images based on analysis of the image histogram. Another object of this invention is to provide a method and apparatus for tonescale generation that is robust with respect to variations in input imaging modality, exposure conditions, and the form of the input calibration function (logarithmic or linear).

The method of the invention is carried out in two major steps. First, the histogram and Cumulative Distribution Function (CDF) are analyzed to determine a region of interest containing the anatomical object being imaged, a foreground region containing highly (x-ray) absorbing materials (e.g., collimator blades, prostheses), and a background region containing direct x-ray transmission outside the object being imaged. This histogram/CDF analysis is done in both the linear and logarithmic domains and the final parameters are selected by a set of decision rules that recombine the information from the two spaces. The second step is the construction of the tonescale which is done initially as a series of connected line segments using the parameters derived in the first step, along with some local and global constraints on the average output signal level and the output contrast. After the initial rough tonescale is constructed, it is adaptively smoothed to create the final tonescale.

The method as outlined depends entirely on the histogram of the input image and is therefore adaptive and robust. However, an improvement on the method also makes use of information about the exam type being processed to produce a tonescale that is even better customized for a given input image.

MODES OF CARRYING OUT THE INVENTION

Figure 12:
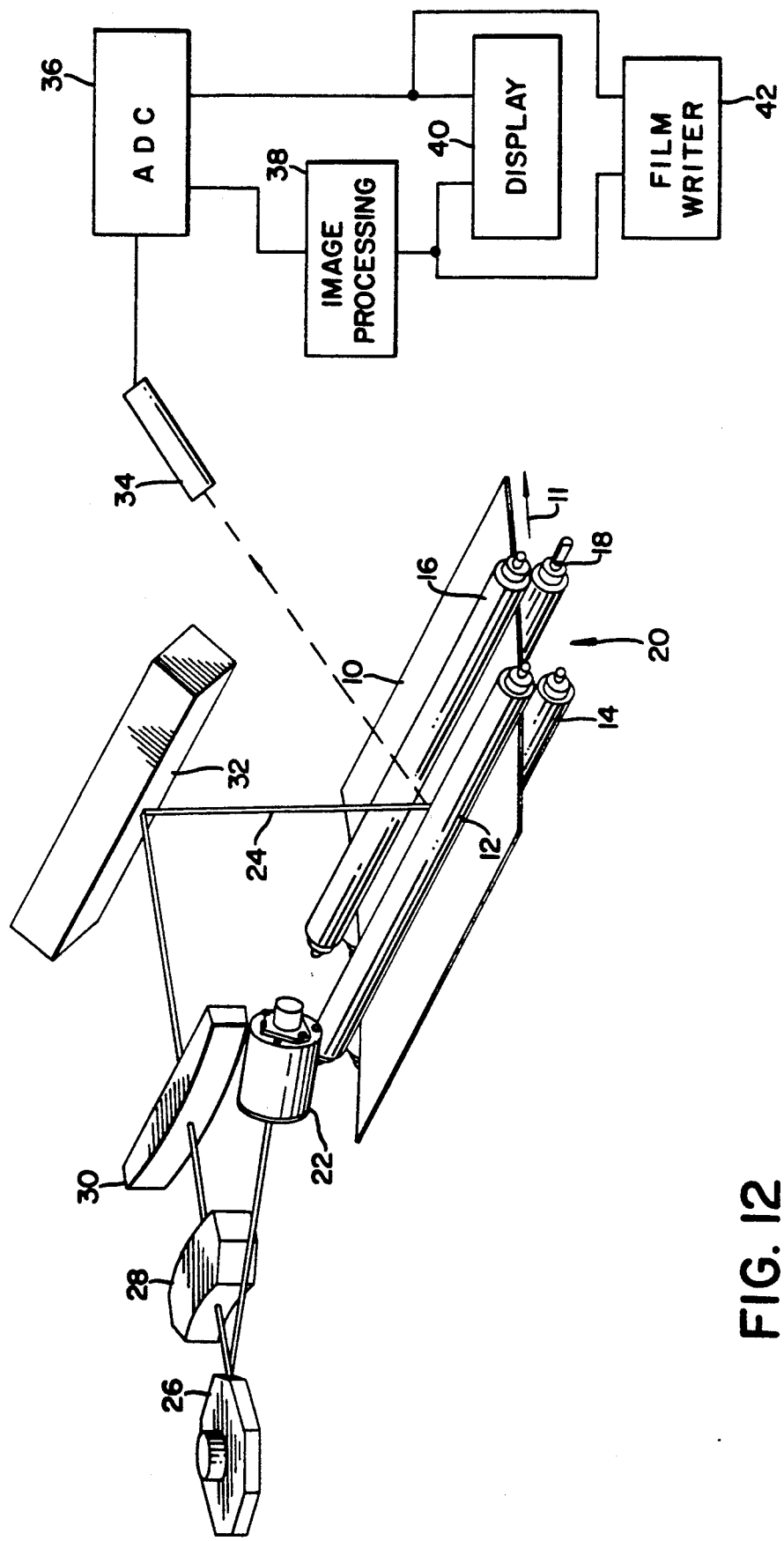
FIG. 12 is a partially perspective, partially block diagram of a digital image processing system including an embodiment of the present invention.

This invention, being a method and apparatus to generate optimum output tonescales for digital images, requires a source of digital images, output devices on which to display them, means for processing the image data, and communications means to move image data from the source to the processing means to the output means. Such a digital image processing system is illustrated in FIG. 12. The x-ray images to be processed with this invention can come, for example, from storage phosphor (computed radiography) systems, film digitizer systems, image intensifier systems, etc. Either linear or logarithmic input calibration functions can be accommodated. In addition, one can use images acquired on computed tomography systems. For output devices, typically there are film writers (either laser printers or CRT printers) and CRT soft displays. The processing means can contain the method and apparatus for carrying out the invention.

FIG. 12 shows a storage phosphor digital radiographic imaging system including an embodiment of the present invention. As shown, storage phosphor 10 is moved in a substantially horizontal direction 11 by means of roller pairs 12, 14 and 16, 18 past a scanning and emitting region 20. A laser 22 produces a laser beam 24 which is scanned across the width of storage phosphor 10 in a scanning line direction by means of rotating polygon mirror 26, scan optic elements 28 and 30 and mirror 32. Scan optic elements 28 and 30 shape the laser beam 24 to a desired size and shape and correct for Fθ distortion as the beam is scanned across phosphor 10. Laser 10 may, for example, be a gas laser or a diode laser which produces a stimulating beam in the red light region.

Light emitted by storage phosphor 10 (e.g. light in the blue light region) is detected by photodetector 34 and converted to a digital image by analog-to-digital converter 36. According to the present invention, the digital image is subjected to automatic tone scale processing and other image processing in image processing apparatus 38 which may, for example, be a digital computer (microprocessor). The digital image is displayed on display monitor 40 and can be reproduced as hard copy (such as radiographic film) by film writer 42 (such as a radiographic laser printer, cathode ray tube multiformat camera thermal printer. The digital image can also be stored in magnetic optical or solid state storage devices or transmitted to a remote location by a communication link. The tone scale processing by apparatus 38 can be embodied in a look-up table (LUT) which is passed with the original digital to display 40 or film writer 42. Alternatively, the tone scale processed digital image can be transmitted.

Alternatively, the apparatus of the invention can reside in a variety of other places on the system. For example, it can be a part of the acquisition device. In this case, the disclosed method would generate a tonescale transformation that would be passed to the output device, either with the image to be processed, or separately over the communications channel. The method could also be a part of the output device. Since the tonescale generation method assumes a known, fixed output calibration function for the output device (i.e., a known relationship between the gray level sent to the device and the signal produced on the output medium), it may be necessary to do one more transformation of the tonescale to achieve the desired visual result when the digital image is finally displayed.

Given an input digital image, the method of the invention proceeds as follows. The histogram and Cumulative Distribution Function (CDF) must first be computed for both linear and log space. See FIGS. 1–4. If the image was acquired with a linear input calibration function, this linear histogram must also be transformed into an equivalent logarithmic histogram (and its corresponding CDF) in order for the analysis to proceed. Conversely, if the image was acquired with a logarithmic input calibration function, this logarithmic histogram must also be transformed into an equivalent linear histogram (and its corresponding CDF). This gives two histograms and two CDFs that will be used in the determination of parameters for the tonescale.

The transformation from a linear to a logarithmic histogram is straightforward. The gray levels in the logarithmic space are related to the gray levels in the linear space through the following equation:

$$m_i(\log) = \sigma^* \log(m_i(\lin) + \gamma) + \delta \quad (1)$$

where $m_i(\log)$ and $m_i(\lin)$ are corresponding gray levels in the logarithmic and linear spaces, and $\sigma$, $\gamma$, and 67 are constants chosen to satisfy certain boundary conditions (e.g., the end points of the gray value range in linear space are mapped to the end points of the gray level range in logarithmic space). The mapping from a histogram originally in logarithmic space to one in linear space is equally straightforward $$m_i(\lin) = 10^{(m_i(\log) - \mu)/\lambda} + \beta \quad (2)$$

where $\mu$, $\lambda$, and $\beta$ are again constants that satisfy the desired boundary conditions of the mapping.

The reason for using a histogram in linear space and one in logarithmic space has to do with the structure of peaks in the histogram in the two spaces and the nature of the tests that will be done to find the starting, ending, and break points that determine the shape of the tonescale. This will be described in more detail below. In addition, the use of two spaces to do the analysis makes the method essentially independent of which type of system was used to acquire the image.

The basic concept behind the tonescales generated using this method is that the optimum tonescale for a linearly acquired image (i.e., one created on a device with a linear input calibration function relating x-ray exposure to gray level) is one in which the x-ray exposure values are mapped linearly into optical density over the region of interest, and rolled off nonlinearly outside the region of interest, that is, in the foreground and background regions. This observation has been made based on thousands of clinical images (primarily acquired on storage phosphor systems) gathered in clinical studies over several years. This argument would also imply that images acquired on logarithmic systems (systems where the input calibration function relating x-ray exposure to gray level is logarithmic) would have an optimum tonescale that is exponential over the region of interest, and nonlinear in the foreground and background regions. This has been found to be the case in clinical studies where such logarithmic devices have been used.

Having established the qualitative shape of the tonescale needed to display linear or logarithmic images, it remains to find a robust way to determine the parameters that will generate such a transformation. The first step in finding the parameters of the tonescale is to find the histograms start and end points. The start and end points (see FIGS. 1 and 3) are the first and last gray levels in the histogram, respectively, whose histogram values are non-zero. All of the pixels in the image are contained between these limits. A set of start and end point is found for both the logarithmic and linear histograms.

In order to separate the histogram into foreground, a region of interest, and background, at least two delimiting points must be found: one that designates the boundary between the foreground and region of interest, which will be called the left point (see FIGS. 2 and 4), and one that designates the end of the region of interest and beginning of the background, which will be called the right point (see FIGS. 1–4). In practice, a distinction must be made between real anatomy that is beyond the region of interest (technically in the background) and direct x-ray transmission around the part being imaged (which is truly background), so a third point, called the background point (see FIGS. 1–4), is also calculated that represents the beginning of the true direct x-ray background. In summary, three gray level points (in addition to the start and end points) are needed to determine the form of the tonescale:

| | |
|---|---|
| Left point: | border between foreground and region of interest |
| Right point: | border between region of interest and remaining anatomy |
| Background point: | border between remaining anatomy and true direct x-ray background |

The determination of these points will be described in detail below. The derivation will assume that low gray levels correspond to low x-ray signals and high gray levels correspond to high x-ray signals, but this is not necessary for the invention. The analysis below can be straightforwardly modified for the inverse situation.

In constructing the tonescale, it is first necessary to find the background point. A method for doing this has been shown in U.S. Pat. No. 5,046,118 (Ajewole and Schaetzing), which uses the concept of partial entropy to divide the histogram into a background region and a non-background region (foreground + region of interest). The background point (see FIGS. 1 and 3) is found for both the linear and logarithmic histograms. If the background point is found at the top of a peak, an initial background point is set at the beginning of the peak for later use in the calculation of right point.

Figure 9:
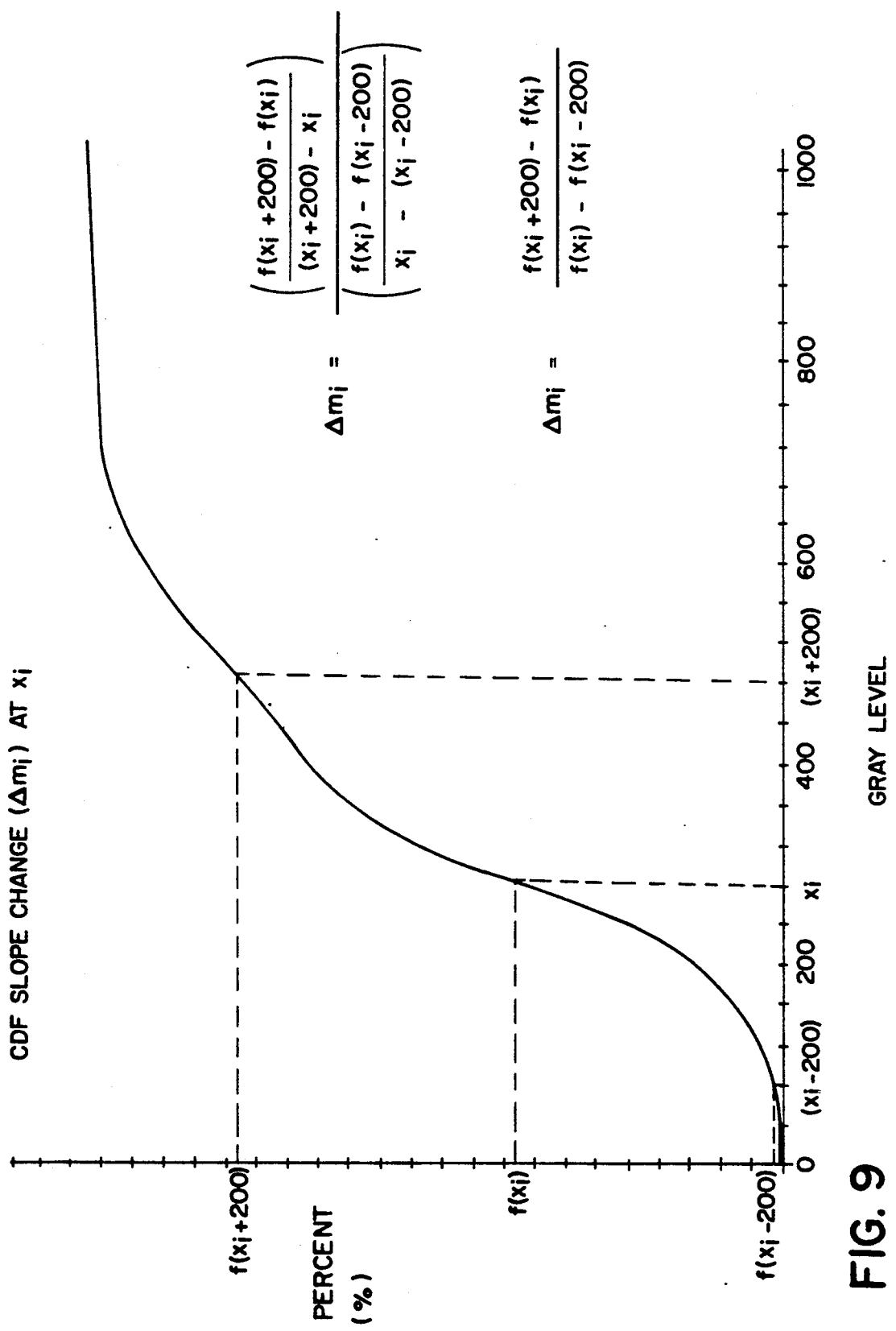
FIG. 9 is a graph useful in describing a cumulative distribution function slope change calculation.

Next, the left point is calculated using the CDF of each of the histograms. This is done using the fact that a significant peak in a histogram (such as would be created by the region of interest) results in a major slope change in the CDF (see FIG. 9). By using ratios of averaged slope changes in the histogram, as will be described, it is possible to find the beginning of the region of interest. Specifically, in the gray level region from 0–100, a window size of 100 is used to calculate slope changes. For each gray level, two CDF slopes are computed. First the average CDF slope in the 100 gray levels above the current gray level is computed. The same calculation is done for the 100 gray levels below the current one (in the case where the calculation would require gray levels below zero, the CDF is assumed to be 0). The ratio of the slopes of the gray levels above the current one to the ones below the current one is stored in an array. In the gray level range 100–200, the same calculation is done except that a varying window size is used, starting at 100 for gray level 100 and increasing to 200 at gray level 200. Between gray level 200 and (background point - 200), the same calculation is done with a fixed window of 200. The array of slope change values is then scanned to find the maximum slope change in the region where the CDF<0.5 (or 50%), and this is defined as the left point. This calculation is done for both the linear and logarithmic CDFs.

Normally the linear portion of the tonescale would start at the left point, but it is possible that the region between the start point and the left point contains some anatomical details. Thus it is necessary to determine whether or not to roll off the tonescale curve to accommodate this area. This is done by looking at the magnitude of the maximum slope change (used to find left point) and at which gray level it occurs. As the left point gets closer to 0, clearly the amount of roll off must decrease. Similarly, as the magnitude of the maximum slope change decreases, the more likely it is that there is some anatomy in this region (this is because a high slope change implies a rapidly rising peak in the histogram and a well delimited region of interest, while a low slope change implies a gradual rise, perhaps with some anatomical detail). In this case, the roll off is increased, sometimes all the way to the start point of the histogram.

In order to calculate the right point of the histogram (the end of the region of interest, and also the end of the linear portion of the tonescale for the case of a linear input calibration function), two methods are used. One of these is the partial entropy technique disclosed in U.S. Pat. No. 5,046,118 (Ajewole and Schaetzing), and the other is a CDF slope change method similar to that used in finding the left point. The partial entropy method produces an effective width of the region of interest (ROI) by analyzing the structure of the histogram between left point and initial end point. The right point (see FIGS. 1 and 3) with this method is given by the sum of the left point and the effective width. The same entropy calculation is done on the logarithmic histogram to produce a second right point estimate. This logarithmic estimate can be mapped back into the linear space for the analysis to be described below.

Figure 1:
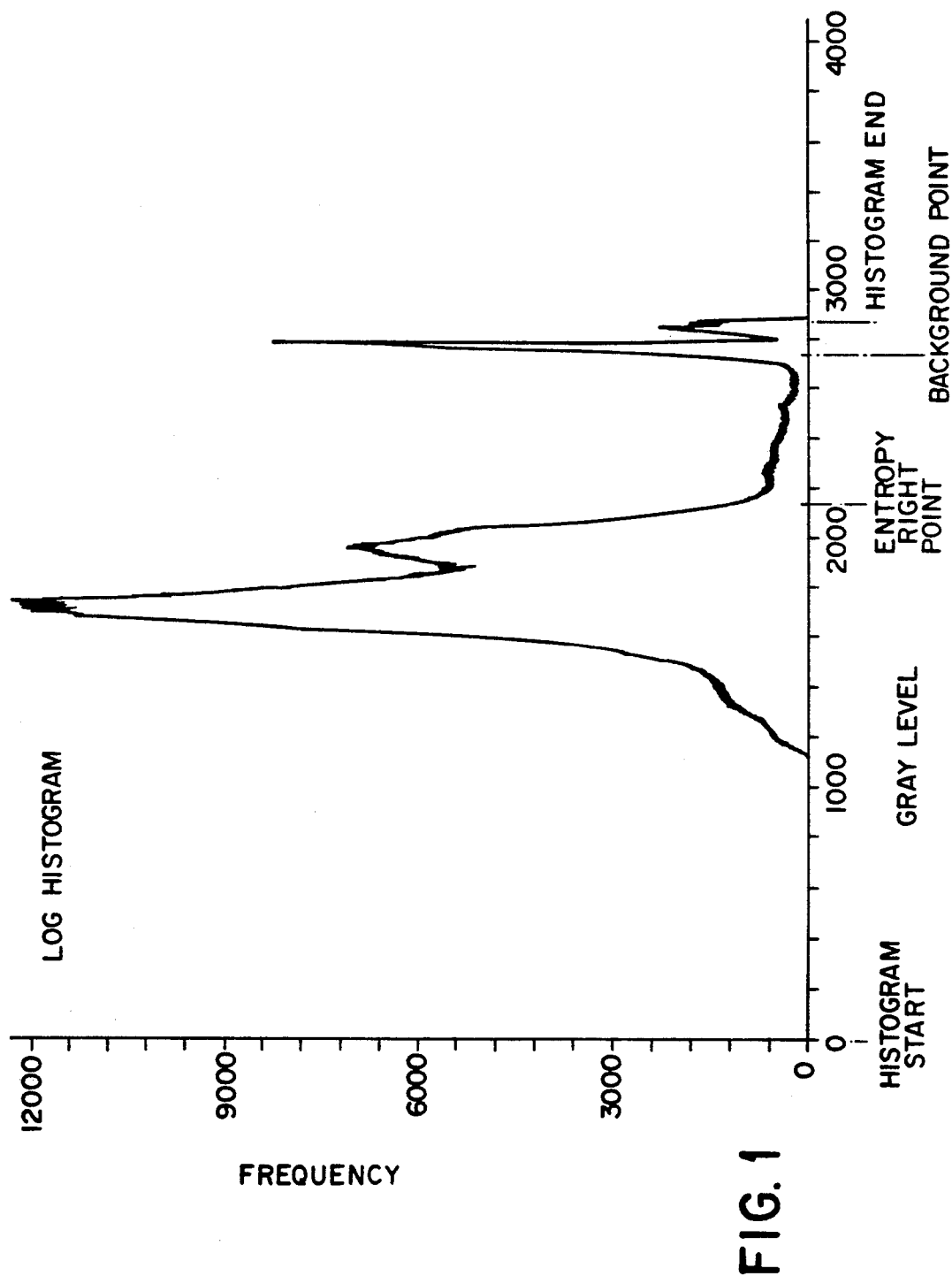
FIG. 1 shows a histogram of a typical projection X-ray image which was acquired with a log input calibration function.
Figure 2:
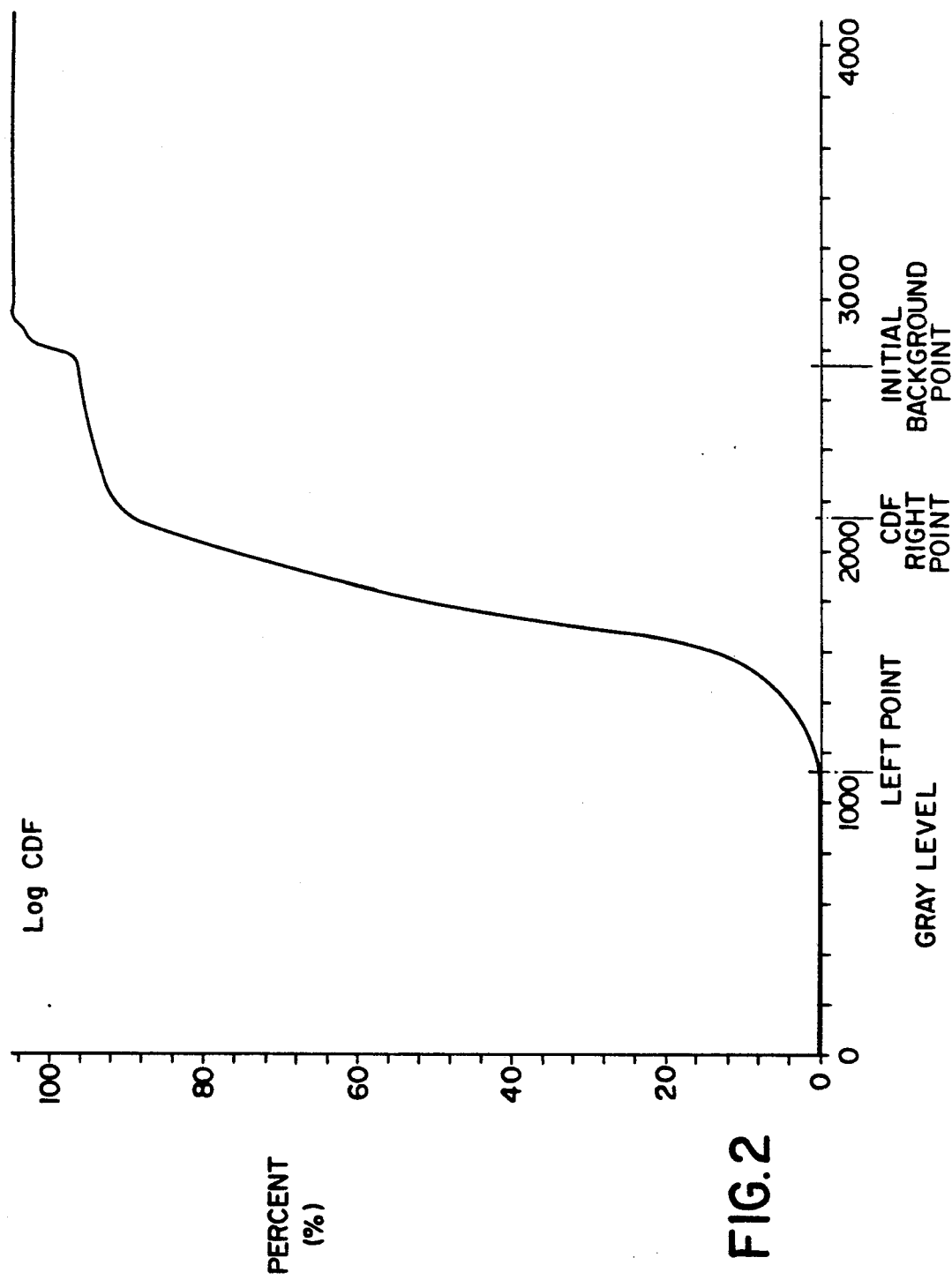
FIG. 2 is a graph showing the cumulative distribution function of the digital image represented by the histogram in FIG. 1.
Figure 3:
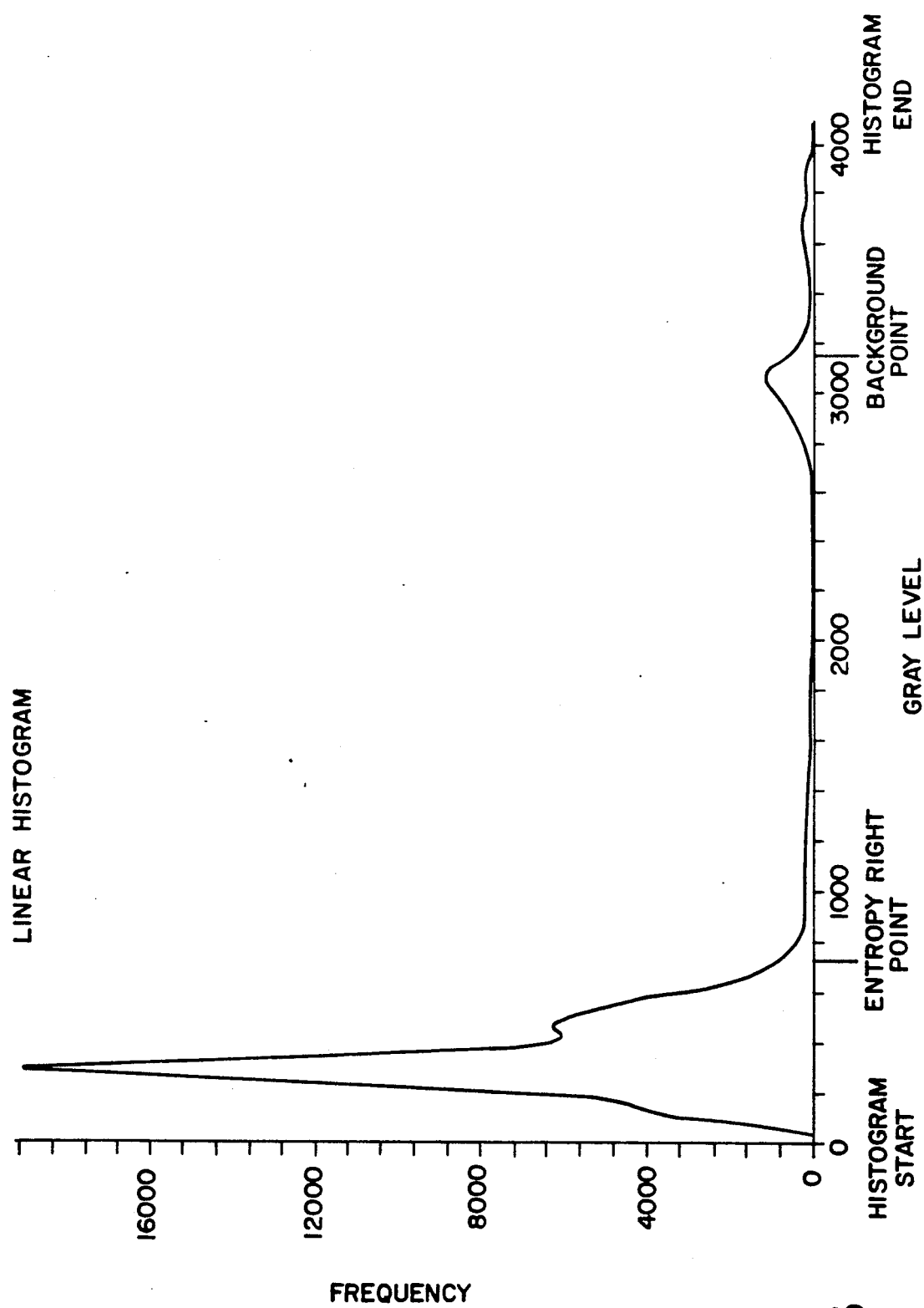
FIG. 3 shows a histogram of a typical projection X-ray image which was acquired with a linear input calibration function.
Figure 4:
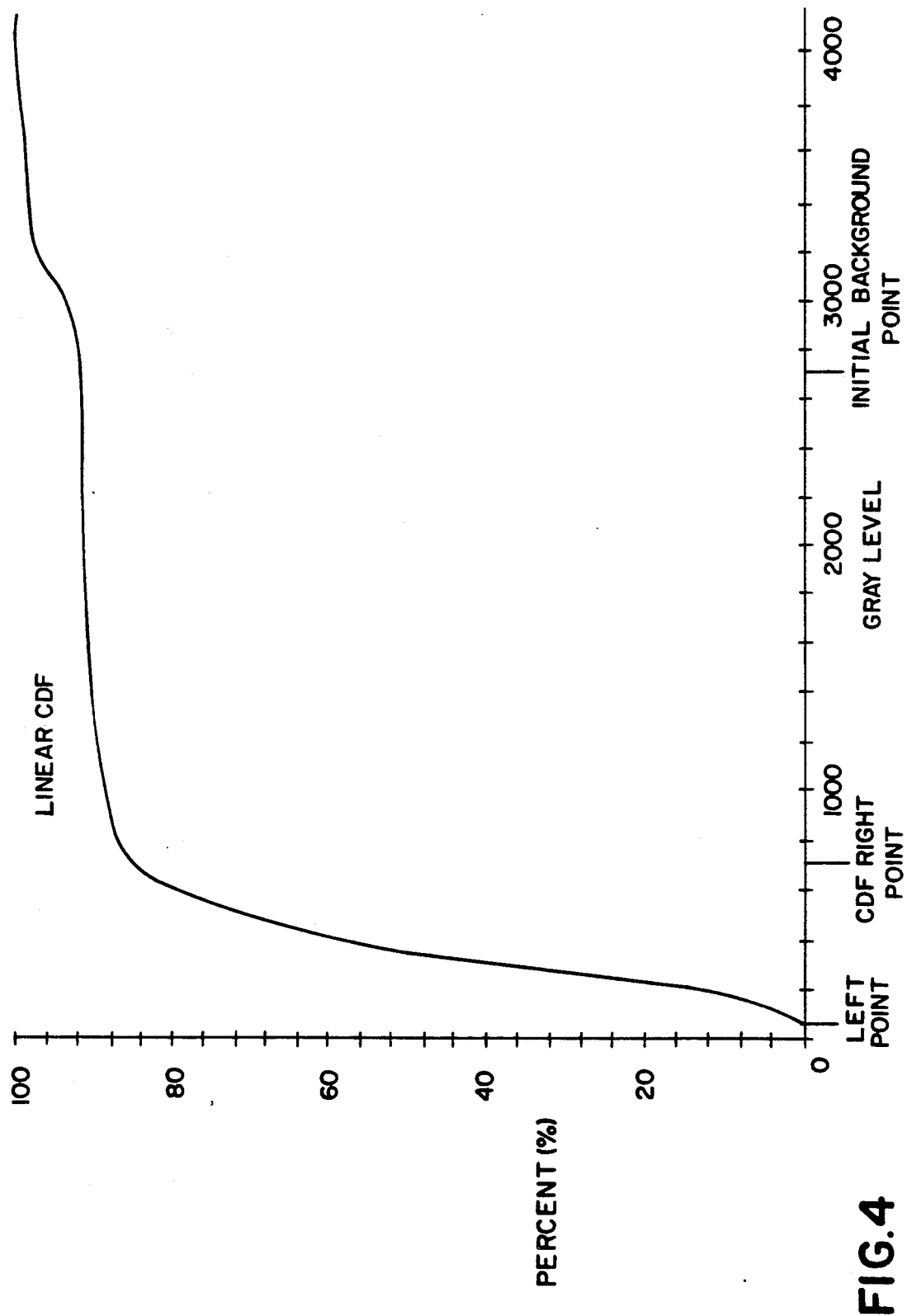
FIG. 4 is a graph showing the cumulative distribution function of the digital image represented by the histogram in FIG. 3.

The CDF method when applied to the linear and logarithmic histograms produces two other estimates of the right point (see FIGS. 2 and 4). In this method, the CDF slope change ratio is found for each gray level (see FIG. 9), just as it was for the left point calculation, using a window of 200 and starting at the gray level where the CDF has reached 0.5 (or 50%). Thus, for each gray level, the average CDF slope of the following 200 gray levels is found, after which the average slope of the 200 preceding gray levels is found. The ratio of the 'following slope' to the 'preceding slope' is stored in an array. This process continues until the gray level within two window widths (i.e., 400) of the initial background point has been reached. The gray level where the minimum slope change ratio occurs is designated the right point.

The above steps have produced four estimates of the right point. Generally, these estimates will not all be the same, and some decision mechanism must select an optimum right point for tonescale construction. The decision mechanism uses a set of closeness criteria in comparing the various right point estimates, with preference usually being given to the estimates generated by the CDF method. Clinical experience with both methods has shown that the CDF method usually gives a somewhat better prediction of the correct right point, but this is not always the case.

In the case of extremity exams, only two of the four estimates, those from the entropy method, are used. The histograms of extremity exams are different in that the CDFs tend to be more linear (for linear input acquisition functions); that is, the incremental percentage of pixels added to the CDF per gray level does not vary as much as with other exams. This is because of the relatively high x-ray transmittance of the (thinner) soft tissues in extremities, which results in the gray levels of the soft tissues being closer to the gray levels representing the background. The criterion for choosing the correct right point in extremity exams is the percentage of pixels added to the CDF per gray level in the input. If this number is greater than or equal to 0.0075%, the higher of the two right point estimates is chosen as the right point. If the percentage of pixels per gray level is less than 0.0075%, then the lower of the two estimates is used as the right point.

Once the left point, right point, initial background point, and background point have been chosen, a final refinement of the initial background point is made, again using the maximum slope change method. Starting at right point, for each gray level, the average CDF slope of the following 200 gray levels (see FIG. 9) and the average slope of the preceding 200 gray levels are computed, and their ratio is found and stored in a memory array. The gray level at which the slope change is maximum becomes the initial background point to be used in later calculations (see FIGS. 2 and 4).

In what follows, the ordinate values of the tonescale will be expressed in terms of aim optical densities assuming a hardcopy output medium. If the output medium is a CRT display, the ordinate scaling can be done similarly using the logarithm of luminance ratios. For example, if $L_{max}$ is the maximum luminance of the display, then an equivalent density at some other luminance, L, can be defined as $D_{eq} = -\log(L/L_{max})$. Normally the range of densities for a CRT display is far less than that Of the hardcopy, but the resulting range can be rescaled to fit the hardcopy range so that the aim densities used below can be easily translated into equivalent luminances on the CRT.

Figure 5:
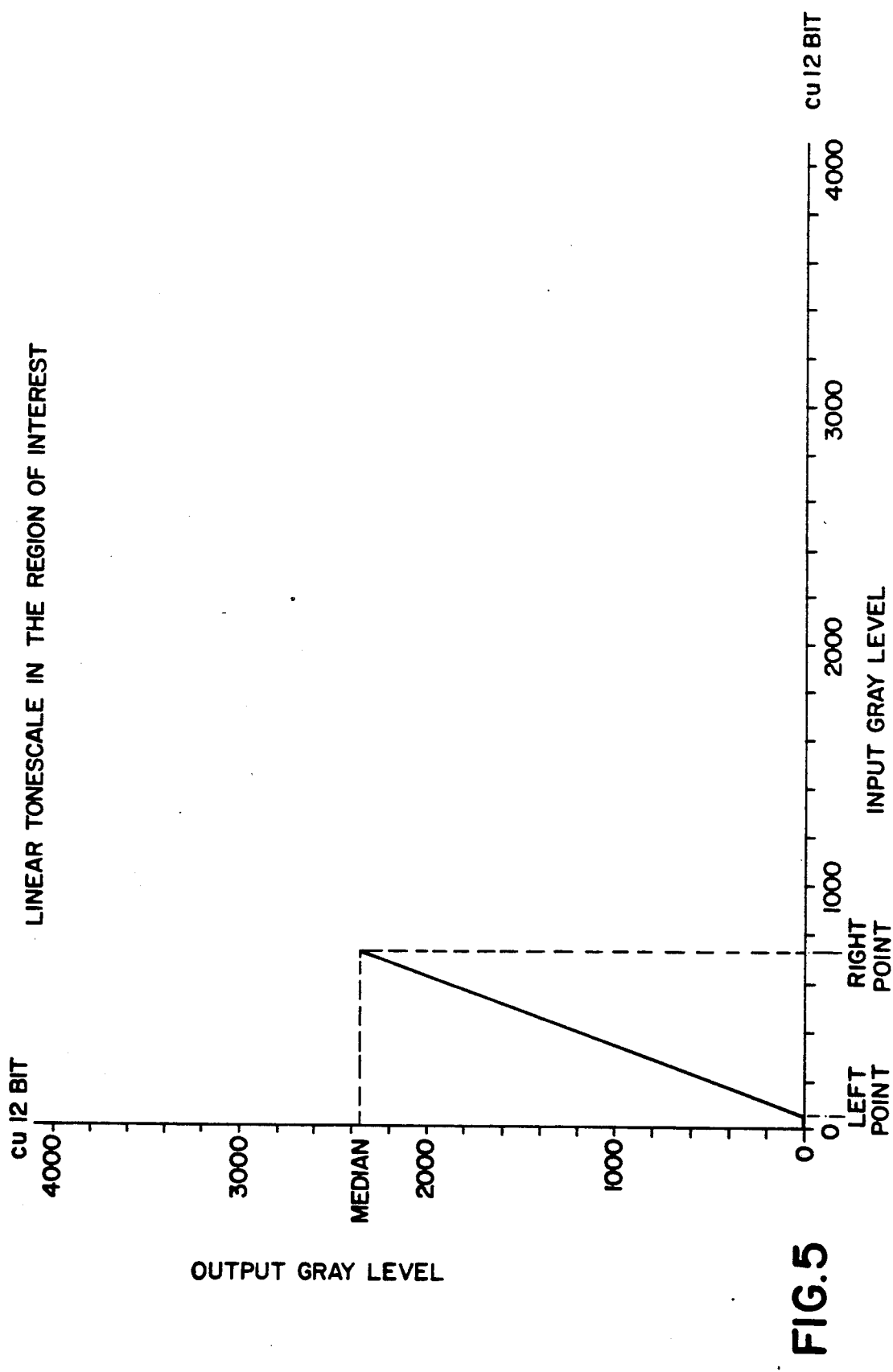
FIG. 5 is a graph illustrating a typical tonescale transformation function generated according to the present invention for the region of interest (left point to right point)

The tonescale construction starts in the interval from left point to right point, i.e., in the region of interest (see FIG. 5). The tone scale in this region is linear for a linear input calibration function. The initial tonescale in the ROI is a straight line going from (left point, 0) to (right point, median), where median is initially set, for example, to 1.7 for a laser printer, and the notation (x,y) denotes the abscissa and ordinate in a graph of output density as a function of gray level. The average density contributed by pixels in the gray level range from left point to right point is computed as the sum of the values of the tonescale at each gray level multiplied by the percentage of pixels at that gray level (i.e., the histogram value normalized to represent a probability), summed from left point to right point. Depending on the exam type being processed, the ROI has a set of experimentally determined aim densities that will optimize the display of the image. For example, the optimum range for a chest is D=0.77–0.83, while for an abdomen it is D=0.83–0.90, and for an extremity it is D=1.03–1.09. If the average density of the ROI is lower than the aim, the median value is increased until it is within range. If the average density is higher than the aim, the median value is lowered until it is in range.

Figure 6:
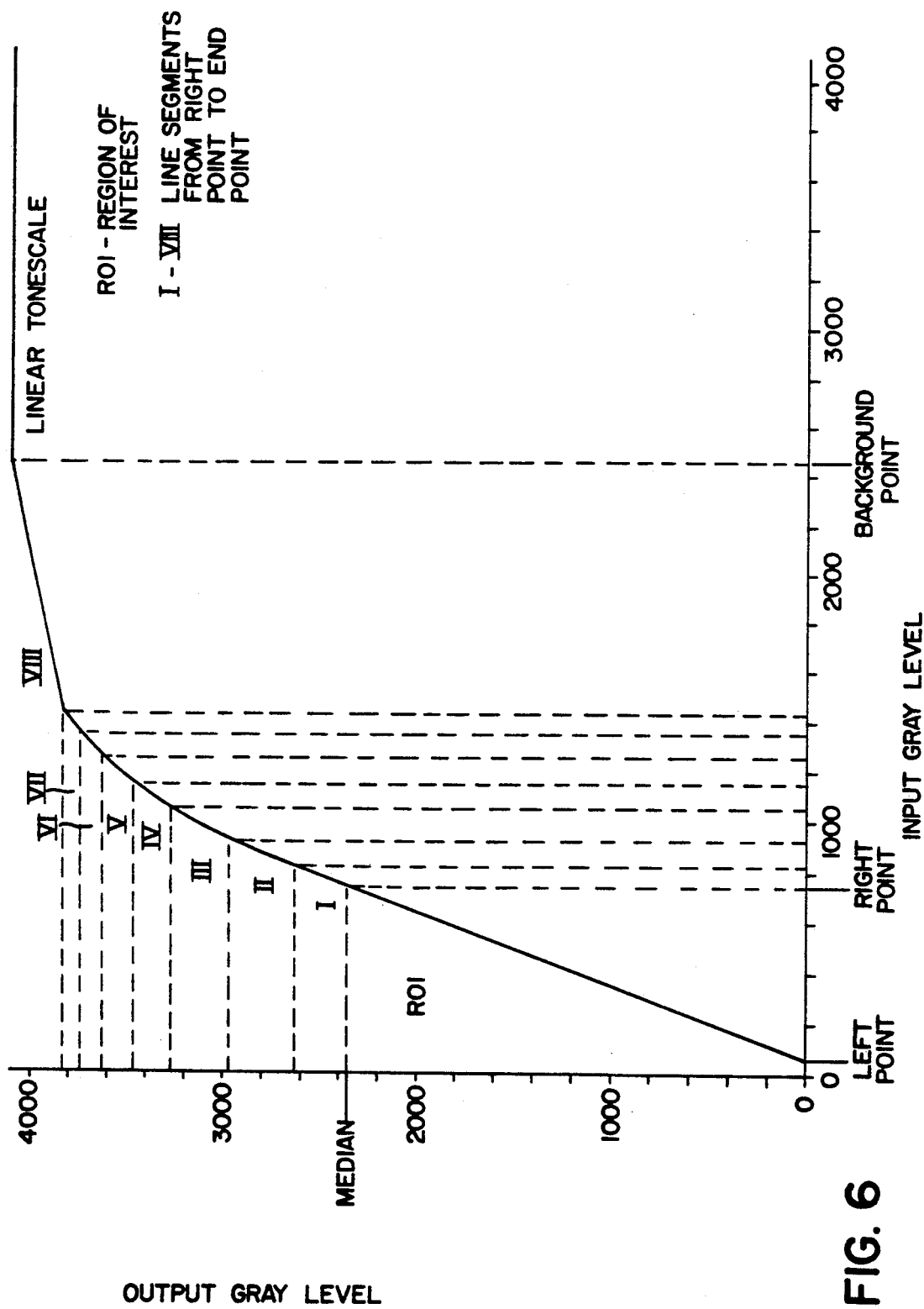
FIG. 6 is a graph useful in describing the linear segments of a typical tonescale transformation that are generated according to the present invention from left point to background point.

The tonescale region from the right point to the background point (see FIG. 6) is constructed as a series of line segments the end point coordinates of which depend on the local structure of the CDF, and some local and global constraints. In particular, if the slope of the consecutive line segments decreases as the background point is approached, there is a constraint on the amount that the slope is allowed to change from segment to segment. This so-called gain decrement depends both on the total change in the CDF value between the right point and the background point and on the distance between the right point and the average gray level value between right point and the background point. The former quantity indicates roughly how many pixels are outside the region of interest, while the latter quantity indicates something about how they are distributed. The bigger the CDF change or the larger the distance between the right point and the average gray level, the larger will be the slope change allowed between segments.

Figure 10:
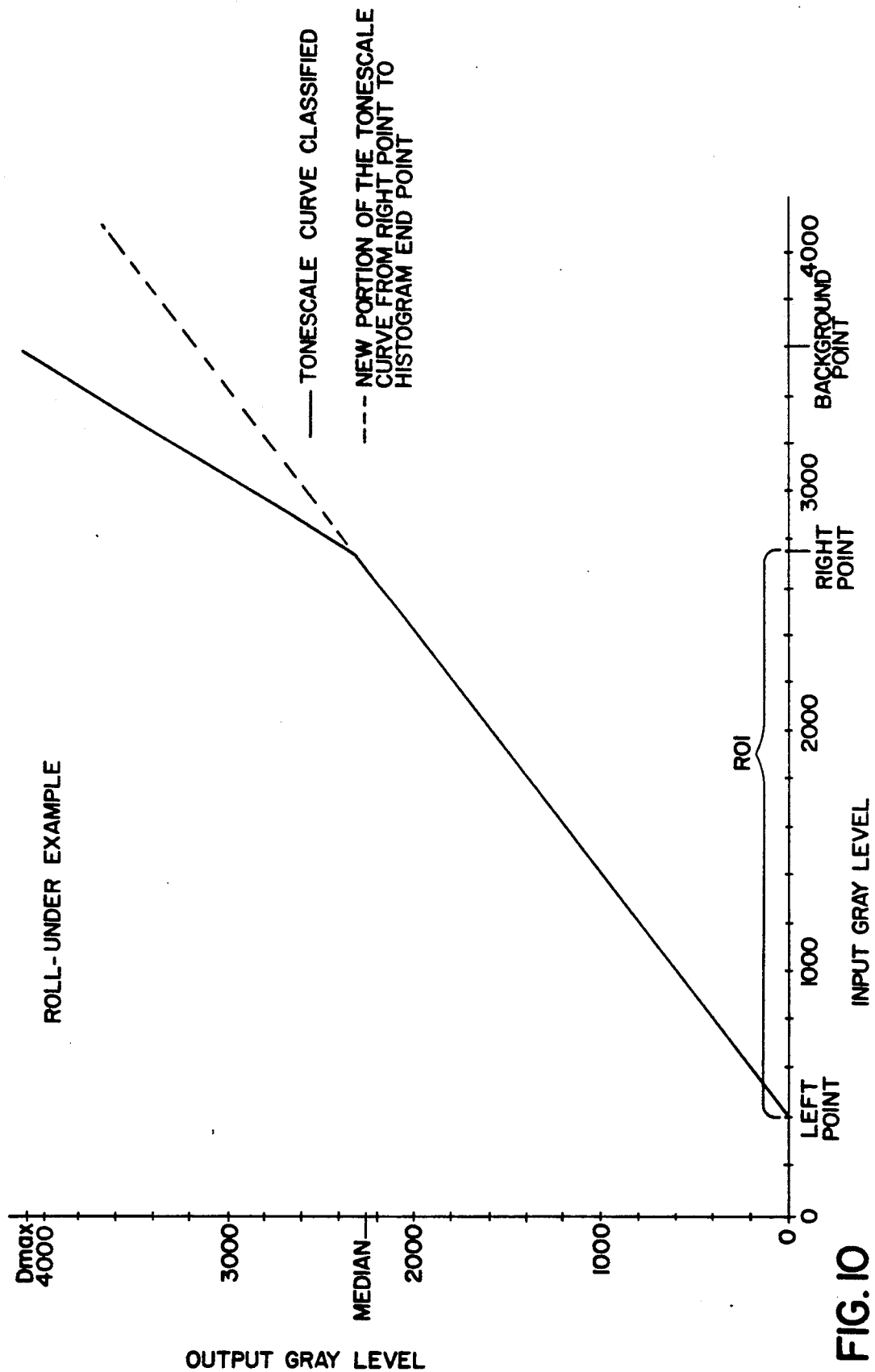
FIG. 10 is a graph illustrating a roll-under tonescale curve and the resulting modified tonescale curve.

Two types of tonescale behavior are possible in the region between right point and background point. If the slope of a line from (right point, median) to (background point, $D_{max}$) is larger than the tonescale slope in the ROI, the tonescale curve is classified as a roll-under curve (see FIG. 10). In this case, the tonescale curve is constructed so that the slope in the range from right point to background point is the same as that of the region of interest. In addition, the tonescale curve is extended with this slope until the histogram end point is reached. In other words, the line segment representing the ROI is simply extended to the right until it hits the histogram end point.

Figure 11:
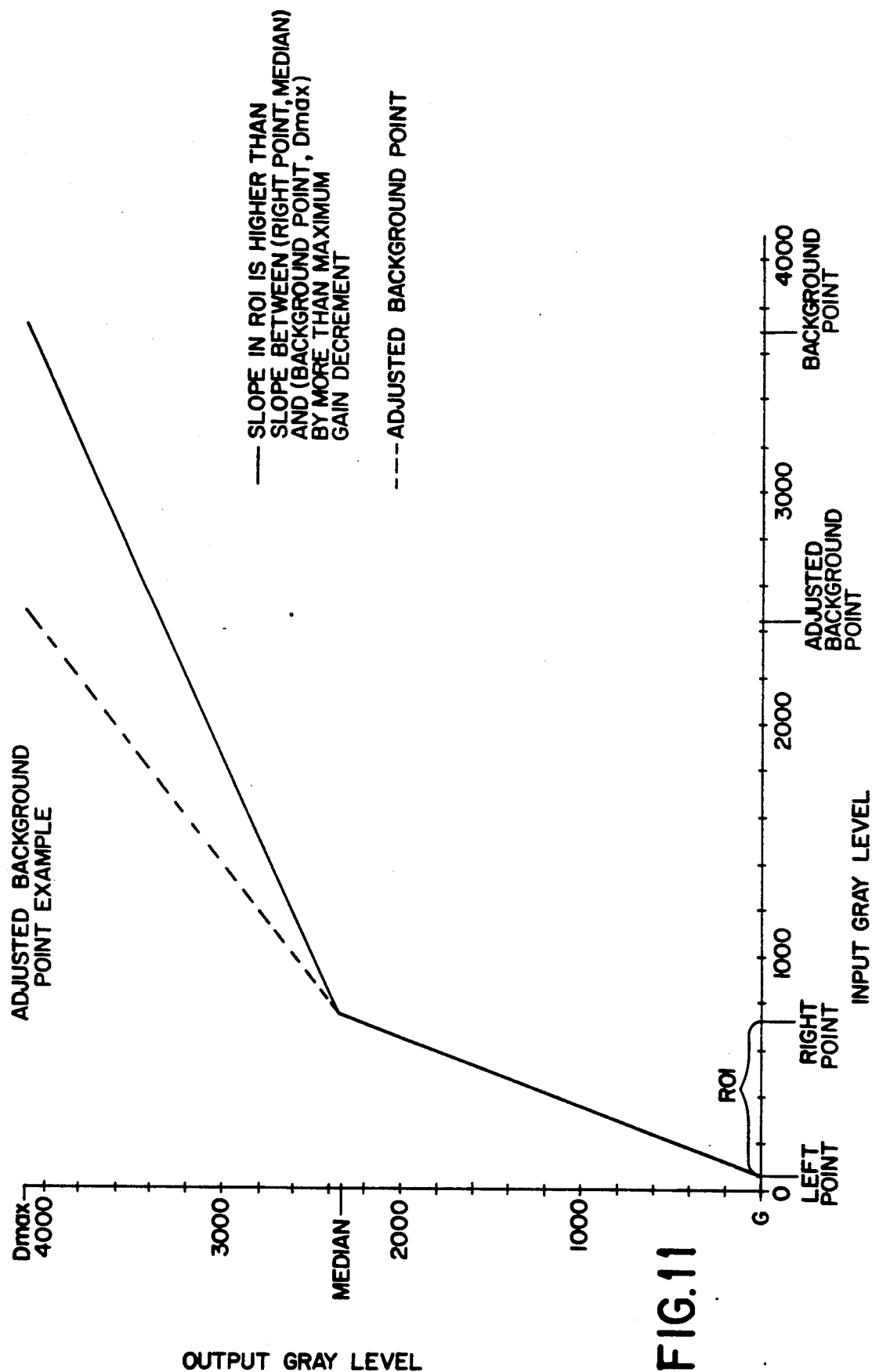
FIG. 11 is a graph useful in describing the modification of the background point due to the slope change from the region of interest (ROI) to the remainder of the tonescale curve.

If the slope from (right point, median) to (background point, $D_{max}$) is less than that of the region of interest (FIG. 6), then the tonescale is classified as a roll-over curve, and multiple line segments will be used to connect to the background point. If the slope in the ROI is higher than the slope between (right point, median) and (background point, $D_{max}$) by more than the maximum gain decrement calculated above, the background point is moved closer to the right point until this change is equal to the maximum gain decrement (see FIG. 11). The region between right point and background point is then filled in with a set of line segments, each starting where the previous one ended, with slopes less than or equal to the segment before. The actual length and slope of each segment depend on the percentage increase in the CDF (starting at the last ordinate) for fixed percentage increases in the remaining gray levels between the current gray level and background point. Thus, the shape of the tonescale at higher output densities depends on the number and distribution of pixels in the histogram in this range, but not as directly as it does in the histogram equalization technique. The fixed percentage increase in gray level used to control the segment slopes is different for different exams. It is 20% for chests and 25% for other exams. Each newly constructed segment is temporarily extrapolated towards maximum gray level to check if it hits $D_{max}$ before or after the background point. If it hits $D_{max}$ before reaching the background point, another segment is added to the tonescale. If it does not hit $D_{max}$ before background point, the current segment is altered to reach $D_{max}$ at the background point and the tonescale construction in this region is finished. From the background point to the end point, the tonescale is constant at $D_{max}$.

After construction of the tonescale, an average density criterion for the entire image (left point to initial background point) must also be satisfied. If the average density of the image is too high the median point is lowered, and the line segment are recalculated until it is within the aim density range. If the average density is too low, the median point is increased until it is within the aim density range, The average densities for the entire image are in the range $D=0.87-0.90$ for chests, $D=0.93-0.96$ for abdomens, and $D=1.12-1.15$ for extremities.

For abdomen and extremity exams, an extra set of calculations must be done. It has been found experimentally that starting the tonescale at (left point, $D_{min}$) for these exams has the effect of making the highly calcified regions in bones in extremities and the denser regions of abdomen exams (especially the subdiaphragmatic region) too white in the output. As a result, the tonescales for these exams are made to start at (left point, $D_{min}+0-1$). This requires calculating a new effective left point by extrapolating the ROI line through this new point until it hits $D_{min}$. From this new left point a new tonescale is calculated in the ROI, between right point and background point, and out to end point using the same methods described above. In addition, the window for rolling off the tonescale at left point (if this is being done) must be changed to accommodate the new left point.

Figure 7:
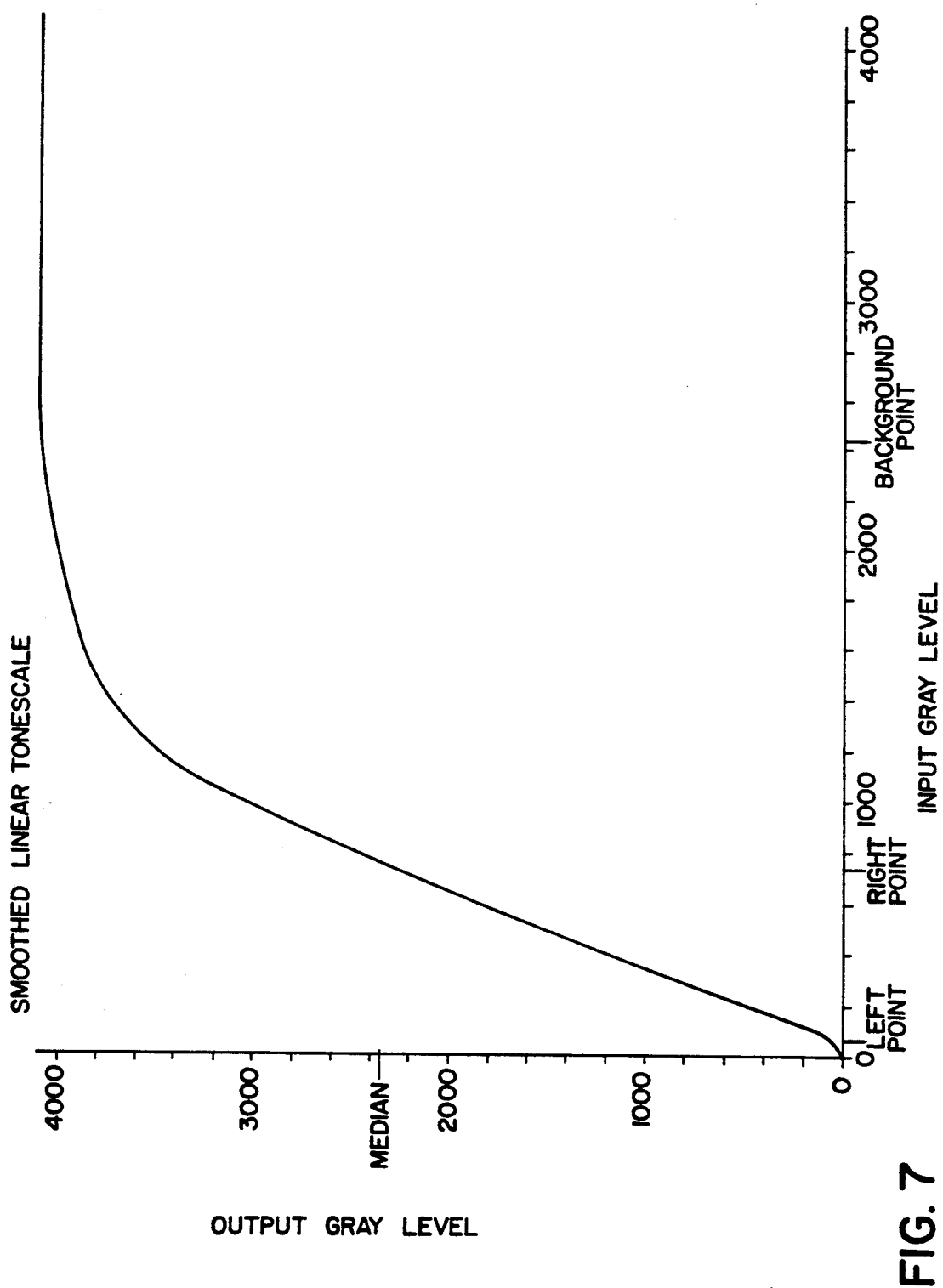
FIG. 7 is a graph illustrating a typical smoothed tonescale transformation function with a roll-off of the left point generated according to the present invention for an input calibration function that is linear.

Before the construction of the final tonescale, the roll-off of the left point is done (see FIG. 7) in order to not clip any anatomical details that might reside between start point and the final left point. This roll-off operation is done using a moving average window, the size of which was calculated above.

The final operation is to smooth the tonescale (see FIG. 7) in order to eliminate any slope discontinuities in the region of the tonescale containing the line segments. It is important to note that the smoothing operation is a selective operation applied only to the tonescale regions that need it. The ROI is not smoothed at all, so it remains linear for a linear input calibration function. A window size approximately one tenth the number of available gray levels is used, starting a half a window size below the right point and proceeding to half a window size away from the maximum gray level. Between this point and the maximum gray level, a continuously decreasing window size is used until the maximum gray level is reached.

Figure 8:
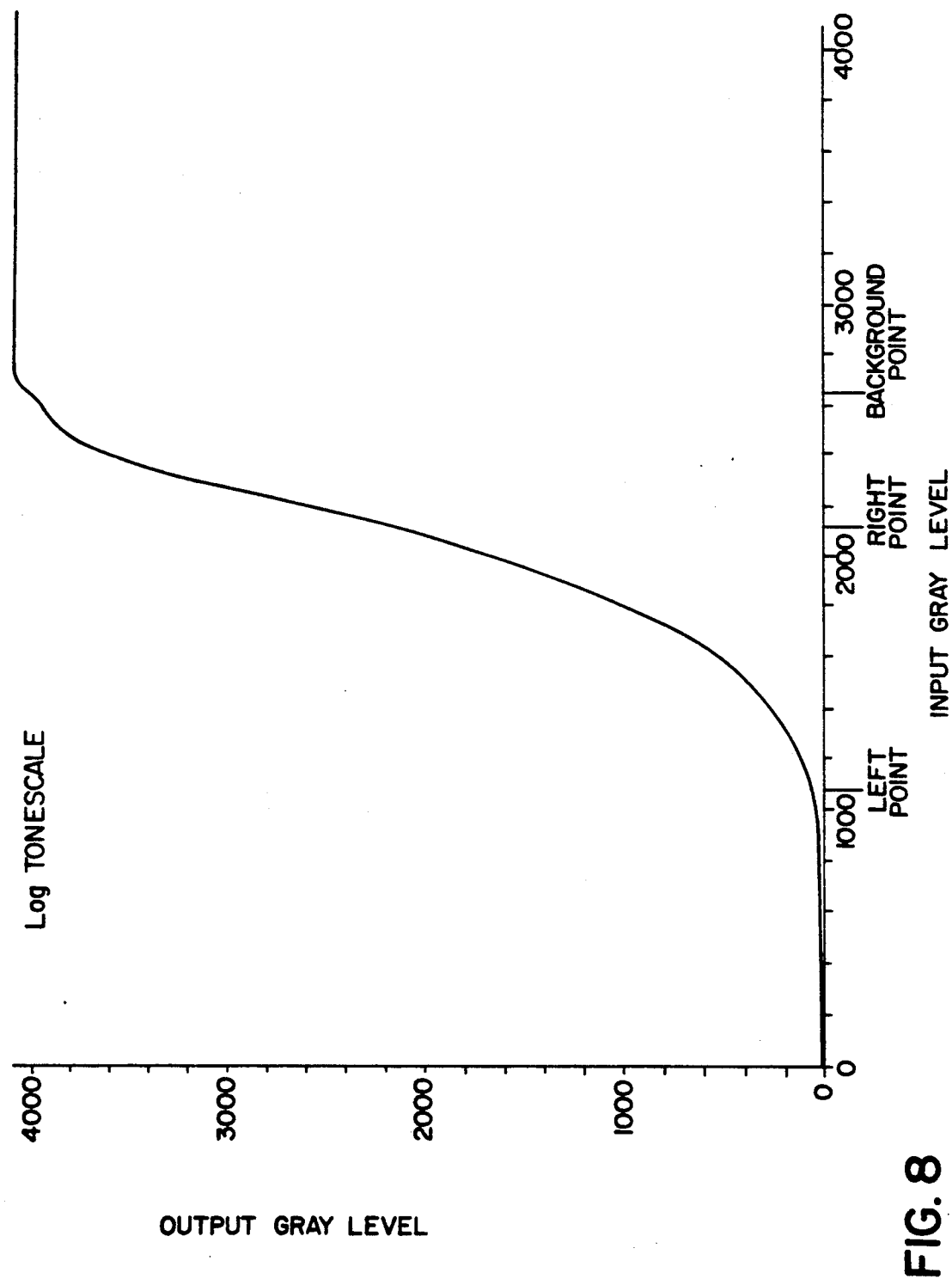
FIG. 8 is a graph illustrating a typical tonescale transformation function that was transformed from the function in FIG. 7 for an input calibration function that is logarithmic.

If the input calibration function is linear, the construction of the tonescale is complete. It the input calibration function is logarithmic, the entire tonescale must be transformed using the logarithmic-to-linear conversion function (Eq. 1) calculated above (see FIG. 8).

Industrial Applicability

The invention has application in digital imaging systems such as in medical diagnostic digital imaging systems.

What is claimed is:

1. A method for generating a tonescale transformation for digital radiographic images comprising the steps of:
   providing a digital radiographic image;
   in a digital computer:
   generating both linear and logarithmic histograms from said digital radiographic image;
   forming a linear cumulative distribution function (CDF) from said linear histogram;
   forming a logarithmic CDF from said logarithmic histogram;
   determining start and end points for each of said linear and logarithmic histograms, respectively, where said start and end points are the first and last gray levels whose histogram values are non zero;
   determining for each of said linear and logarithmic histograms, respective left points which delineate the border between foreground and region of interest, right points which delineate the border between the region of interest and remaining anatomy and background points which delineate the border between remaining anatomy and true direct x-ray background;
   constructing a tonescale function,
   (a) having a linear portion from the left point to the right point in the region of interest, computing the average density in the region of interest, and depending upon a classification of the radiographic image, raising or lowering the median value until it is in a predetermined optimum range for the digital radiographic image classification;
   (b) having one or more line segments from the right point to the background point, wherein the end point coordinates of the line segment(s) are determined by the local structure of the linear CDF;
   (c) having a roll off between the start point and left point using a moving average window; and
   (d) raising or lowering the average density of the entire tonescale depending upon a predetermined average density for a classification of the radiographic image;
   and either processing the digital radiographic image with the tonescale function to produce a processed radiographic image, or creating a look-up table containing the tonescale function and transmitting the look-up table with the digital radiographic image.

2. The method of claim 1 wherein said step of determining the left point for each of said linear and logarithmic histograms is calculated by using the CDF of each of the histograms or each gray level from 0 to a predetermined gray level, calculating the ratio of the slopes of the gray levels of a predefined number of gray levels above the current one to a predefined number of gray levels below the current one and defining the left point as the gray level having the maximum slope change in the region below said predetermined gray level.

3. The method of claim 2 wherein said slope ratio is determined as follows:
   (a) in the gray level region from 0-n, a window size of n is used to calculate slope changes so that for each gray level, two CDF slopes are computed such that the average CDF slope in the n gray levels above the current gray level is computed, the average CDF slope for the n gray levels below the current gray level is computed and the ratio of the slopes of the gray levels above the current one to the gray levels below the current one is stored in a memory;
   (b) in the gray level range n-2n, the same calculation is done except that a varying window size is used starting at n at gray level n and increasing to 2n at gray level 2n;
   (c) between gray level 2n and background point-2n, the same calculation is done with a fixed window of 2n; and
   (d) the slope change values stored in memory are scanned to find the maximum slope change in the region where the CDF is less than 0.5 and this gray level is defined as the left point.

4. The method of claim 2 wherein roll-off of the tonescale curve from the start point to the left point is determined by looking at the magnitude of the maximum slope change used to find the left point and as the left point gets closer to 0, decreasing the amount of roll-off, and as the magnitude of the maximum slope change decreases, increasing the roll-off.

5. The method of claim 1 wherein the right points of said linear and logarithmic histograms are determined using a partial entropy technique wherein an effective width of the region of interest is determined by analyzing the structure of the respective histogram and the right point is determined by the sum of the left point and the effective width.

6. The method of claim 1 wherein said right point of said linear and logarithmic histograms is determined using the CDF of each histogram such that a CDF slope change ratio is found for each gray level starting at the gray level where the respective CDF has reached 0.5 and using a window of 2n gray levels such that for each gray level, the average CDF slope of the following 2n gray levels is found and the average slope of the 2n preceding gray levels is found and the ratio of the following slope to the preceding slope is stored in memory, continuing to find the ratio for each gray level within two window widths of the initial background point and determining the gray level where the maximum slope change ratio occurs as the right point.

7. The method of claim 6 wherein said digital image is a 12 bit image and wherein said window is set at 200 so that the ratio for each gray level is determined by taking the average CDF slope of the following 200 gray levels over the average slope of the 200 preceding gray levels.

8. The method of claim 6, including the further step of finding the right points of said linear and said logarithmic histogram by means of a partial entropy technique which produces an effective width of the region of interest by analyzing the structure of the histogram and the respective right point is determined by the sum of the left point and the effective width, and further including the step of mapping the right point of the logarithmic histogram determined by the CDF slope ratio technique and the right point of the logarithmic histogram determined by the partial entropy technique back into linear space to produce four estimates of the right point and then selecting an optimum right point for tone scale construction using a set of closeness criteria in comparing the various right point estimates.

9. The method of claim 5 wherein said provided digital radiograph image is a image of an anatomical extremity of a human and wherein the correct right point is chosen by determining the percentage of pixels added to the respective CDF per gray level in the input, and if this number is greater than or equal to 0.0075%, the higher of the two right point estimates is chosen as the correct right point and if the percentage of pixels per gray level is less than 0.0075%, then the lower of the two right point estimates is used.

10. The method of claim 1 wherein said background point is an initial estimate and a final refinement of the background point is made using the maximum slope change technique such that starting at the right point for each gray level, the average CDF slope of the following x gray levels and the average slope of the proceeding x gray levels are computed and their ratio found and stored in a memory and choosing the gray level in which the slope change is maximum as the final background point for the tone scale function.

11. The method of claim 1 wherein the step of constructing a tonescale function in the linear portion from the left point to the right point is effected as a graph of output density as a function of gray level and the initial tonescale is a straight line going from left point 0 to right point median where median is initially set to a value of 1.7, and including average density contributed by pixels in the gray level range from left point to right point as the sum of the values of the tonescale at each gray level multiplied by the percentage of pixels at that gray level summed from left to right point, wherein said predetermined optimum range for the digital radiographic image classification is a density value for a digital radiographic image of an anatomical part of a human and said median value of said linear portion of said tonescale function is raised or lowered until it is in a predetermined optical density range for a specified anatomical part.

12. The method of claim 11 wherein the optical density range for a chest is D=0.77–0.83.

13. The method of claim 11 wherein the optimum density range for an abdomen is D=0.83–0.90.

14. The method of claim 11 wherein the optimum density range for an extremity is D=1.03–1.09.

15. The method of claim 1 wherein said step of constructing a tonescale function between said right point and said background point, includes determining whether the slope of a line from the right point to the background point is larger than the slope from the left point to the right point, and if it is, then the tonescale curve is classified as a roll-under curve and the tonescale curve from the right point to the background point is constructed so that the slope is the same as that in the region of interest, that is the line segment representing the region of interest is extended to the right until it hits the background point gray level.

16. The method of claim 1 wherein the step of constructing a tonescale function between said right point and said background point includes determining whether the slope from the right point to the background point is less than that of the region of interest and, if it is, the tonescale is classified as a roll-over curve and multiple line segments are used to connect the background point.

17. The method of claim 16 wherein said line segments are determined as follows. If the slope in the region of interest is higher than the slope between the right point and background point by more than a maximum gain decrement, the background point is moved closer to the right point until this change is equal to the maximum gain decrement and the region between right point and background point is filled in with a set of line segments, each starting where the previous one ended with slopes less than or equal to the segment before with the actual length and slope of each segment depending on the percentage increase in the CDF for fixed percentage increases in the remaining gray levels between the current gray level and the background point.

18. The method of claim 17 wherein the fixed percentage increase in gray levels used to control the segment slopes is set as 20% for a digital radiographic image of a human chest and at 25% for a digital radiographic image of other human anatomical parts.

19. The method of claim 18 wherein each newly constructed line segment is temporarily extrapolated towards a maximum gray level to see if it hits the maximum density before or after the background point and if it hits maximum density before reaching the background point, another line segment is added to the tonescale, and if it does not reach the maximum density before the background point, the current line segment is altered to reach the maximum density at the background point and the tonescale construction in this region is terminated so that the tonescale is constant at maximum density from the background point to the end point.

20. The method of claim 1 wherein the step of constructing a tonescale function to raise or lower the average density of the entire tonescale is dependent upon a predetermined average density of a digital radiographic image of a human anatomical part such that the predetermined density range for a chest radiographic image is $D=0.87-0.90$, the predetermined density range for an abdomen radiographic image is $D=\mathbf{0.93-0.96}$, and the predetermined density range for an extremity radiographic image is $D=1.12-1.15$.

21. The method of claim 1 wherein said method of constructing a tonescale is smoothed to eliminate any slope discontinuities in the region of the tonescale containing line segments, by using a window size approximately one-tenth the number of available gray levels, starting at a half a window size below the right point and proceeding to half a window size away from the maximum gray level and between this point and the maximum gray level, a continuously decreasing window size is used until the maximum gray level is reached.

22. The method of claim 1 wherein if the input calibration tonescale function is logarithmic, the linear tonescale function is transformed into log space using a logarithmic to linear conversion function.

* * * * *